US010116234B2

United States Patent
Raboni et al.

(10) Patent No.: US 10,116,234 B2
(45) Date of Patent: Oct. 30, 2018

(54) DC/AC CONVERTER COMPRISING CONTROL MEANS FOR INRUSH CURRENT PROTECTION

(71) Applicant: ABB Schweiz AG, Baden (CH)

(72) Inventors: Pietro Raboni, Terranuova Bracciolini (IT); David Martini, San Giovanni Valdarno (IT); Silvia Mastellone, Obersiggenthal (CH); Stefan Almer, Baden-Dättwil (CH)

(73) Assignee: ABB Schweiz AG, Baden (CH)

( * ) Notice: Subject to any disclaimer, the term of this patent is extended or adjusted under 35 U.S.C. 154(b) by 20 days.

(21) Appl. No.: 15/386,511

(22) Filed: Dec. 21, 2016

(65) Prior Publication Data

US 2017/0187303 A1 Jun. 29, 2017

(30) Foreign Application Priority Data

Dec. 23, 2015 (EP) ..................... 15202616

(51) Int. Cl.
*H02M 7/44* (2006.01)
*H02M 1/14* (2006.01)
*H02M 1/32* (2007.01)
*H02J 3/38* (2006.01)
*H02M 7/5387* (2007.01)

(52) U.S. Cl.
CPC .............. *H02M 7/44* (2013.01); *H02J 3/383* (2013.01); *H02J 3/385* (2013.01); *H02M 1/14* (2013.01); *H02M 1/32* (2013.01); *H02M 7/5387* (2013.01); *Y02E 10/563* (2013.01); *Y02E 10/58* (2013.01)

(58) Field of Classification Search
CPC ............ H02M 1/14; H02M 1/32; H02M 7/44; H02M 7/5387; H02J 3/383; H02J 3/385
See application file for complete search history.

(56) References Cited

U.S. PATENT DOCUMENTS

| 8,804,383 B2 | 8/2014 | Zhan et al. | |
|---|---|---|---|
| 2002/0080633 A1* | 6/2002 | Kang | F02C 7/08 363/71 |
| 2003/0007369 A1* | 1/2003 | Gilbreth | H02J 1/10 363/35 |
| 2003/0218887 A1* | 11/2003 | Kojori | H02M 7/797 363/16 |

(Continued)

FOREIGN PATENT DOCUMENTS

EP 2328262 A2 6/2011

OTHER PUBLICATIONS

Kazmierkowski, et al., Current control techniques for three-phase voltage-source PWM converters: a survey, IEEE Transactions on Industrial Electronics, Oct. 5, 1998, 14 pages.

(Continued)

*Primary Examiner* — Jue Zhang
(74) *Attorney, Agent, or Firm* — J. Bruce Schelkopf; Taft Stettinius & Hollister LLP

(57) ABSTRACT

A DC/AC converter is provided with a new control device and method for managing inrush current transients during operation without requiring additional external devices or emergency operating modes forcing the DC/AC converter to shut down. The present invention is particularly, but not exclusively, aimed at grid connected DC/AC, converters, often subject to inrush current phenomena due to perturbations in the grid.

20 Claims, 1 Drawing Sheet

(56) References Cited

U.S. PATENT DOCUMENTS

2011/0013432 A1    1/2011  Wagoner
2012/0087048 A1    4/2012  Yin et al.
2013/0027993 A1*   1/2013  Tan ...................... H02M 7/515
                                                      363/40

OTHER PUBLICATIONS

European Search Report, EP15202616, ABB Technology AG, dated Feb. 26, 2016, 12 pages.

* cited by examiner

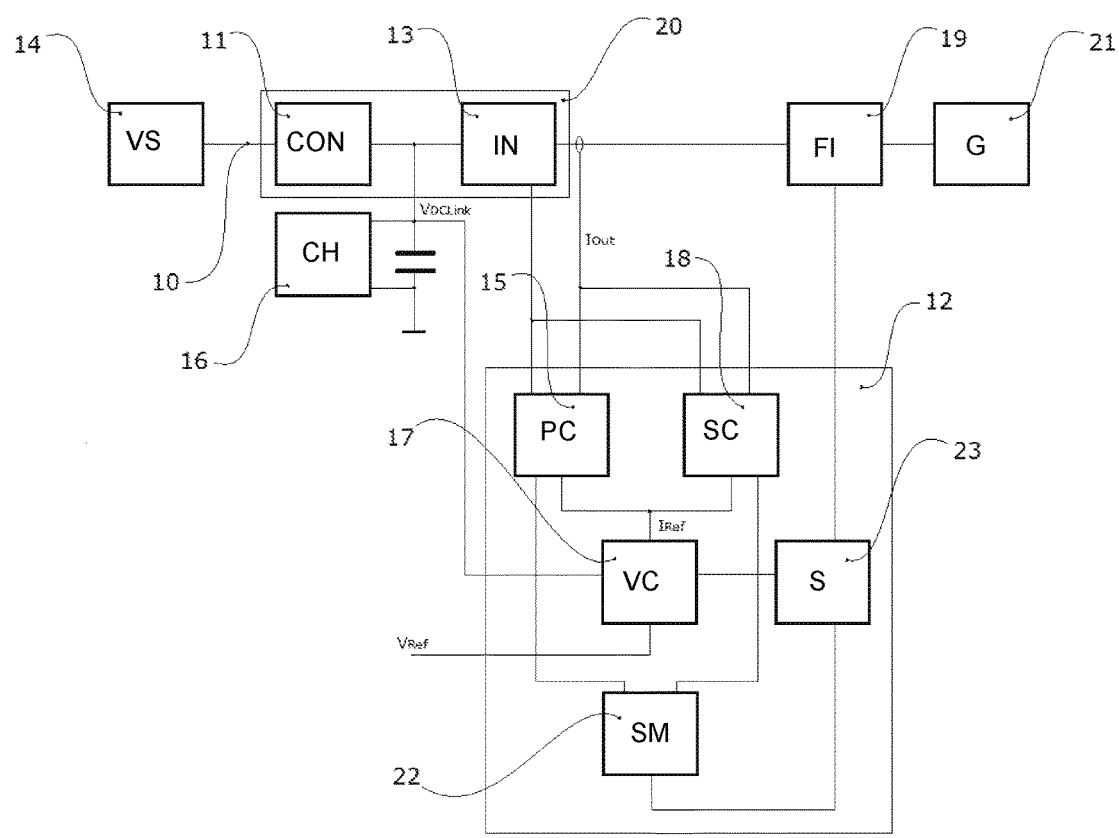

DC/AC CONVERTER COMPRISING CONTROL MEANS FOR INRUSH CURRENT PROTECTION

TECHNICAL FIELD OF THE INVENTION

The present invention relates to a DC/AC converter apparatus and to a power conversion and generation system comprising such DC/AC converter apparatus. In particular, but not exclusively, the present invention relates to DC/AC conversion systems of the electrical power generated by photovoltaic systems and adapted to be connected directly to the power grid.

STATE OF THE ART

The disclosed invention concerns the control of a grid connected DC/AC converter in the presence of sudden, unpredicted inrush currents due to a disturbance in the grid. The inrush current phenomena cause large current peaks in the DC/AC converter, which may trip the DC/AC converter into overcurrent protection mode, thus interrupting power delivery. Proper handling of inrush current phenomena is therefore crucial for reliable power delivery. Improved handling of inrush currents may also reduce the production cost of the DC/AC converter because keeping the currents at a lower level allows employing semiconductor components having lower current ratings, and therefore less expensive.

In renewable energy generation systems, the electric power is often DC, as in e.g., photovoltaic (PV) plants, or variable frequency AC, as in e.g., wind power plants. In such systems, grid connected DC/AC converters are required to feed power to the AC distribution grid and, therefore, an adequate control of said DC/AC converters is crucial for achieving uninterrupted power delivery.

Inrush current phenomena represents a threat and pose a significant challenge to the uninterrupted operation of the DC/AC converter. Inrush current is mainly caused by sudden voltage sags on the grid side, which cause an increase in the DC/AC converter inductor current. Said grid side voltage sags can be due to a grid fault or they can be caused by the switching in of a grid device, like, for instance, compensation capacitor banks. Such capacitor banks are often used in PV plants to comply with the overall capability requirements of the system operator. Inrush current phenomena are more common in developing countries and emerging markets, characterized by weaker grid networks often supplied by renewables plants.

Inrush current may cause an overcurrent in the switching devices, overcurrent that will most likely trip the DC/AC converter. Thus, it is very important that the control system be able to keep the DC/AC converter current below the maximum tolerated value to guarantee uninterrupted power delivery. Furthermore, improved control performance may enhance the performances during grid faults which often leads to overcurrent in the DC/AC converter. If the current can be guaranteed to remain below a lower threshold, then less expensive semiconductors can be employed for implementing the converter switches thus reducing the overall production cost of the DC/AC converter.

The reduction of the inrush current in grid connected DC/AC converter is often accomplished, in the state of the art systems, with additional devices to be inserted between the grid and the DC/AC converter. As an example, U.S. Pat. No. 8,804,383 discloses a starter for a grid-connected DC/AC converter and related control method. Said starter comprises a controller, and a first switch and a first resistor connected in parallel. The controller detects a DC voltage signal from the DC/AC converter and when the DC voltage exceeds a predetermined voltage threshold, the first switch is turned on thus by-passing the current limiting resistor. Other systems known in the art manage to control the inrush current by overriding the control of the main switches of the DC/AC converter and entering emergency operating modes forcing the DC/AC converter to shut down and restart, after the emergency is over, through a procedure that generally requires a considerable time of full or partial inactivity of the DC/AC converter.

It is therefore an object of the present invention to introduce a new control device and method for a DC/AC converter adapted to manage inrush current during operation in a quick and reliable manner, without requiring additional external devices or emergency operating modes forcing the DC/AC converter to shut down. The present invention is particularly, but not exclusively, aimed at grid connected DC/AC converters, often subject to inrush current phenomena due to perturbations in the grid.

It is another object of the present invention to introduce a new DC/AC converter—particularly, but not exclusively, a new grid connected DC/AC converter—comprising said new control device and method.

Further features and advantages of the present invention will be apparent in the following description of a non-limitative embodiment with reference to the FIGURES in the accompanying drawings, which are diagrammatic and show functional blocks which are adapted to be implemented with a hardware structure according to different circuitry solutions in practice or with a software structure, for example coded into firmware and executed by a suitable digital signal processor (DSP). In detail:

FIG. 1 illustrates a schematic diagram of a preferred embodiment of the DC/AC converter apparatus according to the present invention.

DETAILED DESCRIPTION OF THE INVENTION

With reference to enclosed FIG. 1, the block diagram of a preferred embodiment of the apparatus according to the present invention is illustrated, comprising:

A DC/AC converter 20 adapted to convert the voltage of a DC voltage source—preferably comprising a renewable DC voltage source—into an AC voltage for supplying a load and for delivering to a utility grid (G) 21;

A filter (FI) 19 interposed between the output of said DC/AC converter 20 and the grid 21 and adapted to remove high frequency ripple from said AC voltage;

A controller 12 adapted to manage and regulate the operation of said DC/AC converter, said controller 12 being preferably associated to a user interface.

Said DC/AC converter 20 may comprise a single stage or a double stage DC/AC converter.

A single stage DC/AC converter comprises an inverter adapted to convert the DC voltage from said DC voltage source into an AC voltage adapted to be delivered to the utility grid 21 and to supply AC loads within the micro grid where the DC/AC converter is located.

A double stage DC/AC converter comprises a DC/DC converter (CON) 11 and a cascaded inverter (IN) 13. A further block comprising a chopper (CH) 16 converter may be present working as a "brake" to the DClink voltage between said DC/DC converter 11 and said inverter 13, and adapted to dissipate possible power surplus that would result in dangerous high voltages across the DClink capacitor bank and to the downstream inverter 13. Said chopper converter 16 is normally idle and operates, when the DC input voltage is larger than the DClink voltage by a predetermined amount, in case of failure of the converter or in case of dangerous transients.

The DC/DC converter 11 is adapted to boost and/or regulate the DC voltage from the DC voltage source (VS) 14 in order to make it more stable and to optimize the power transfer from the renewable DC voltage source, preferably employing, in case of photovoltaic source, a suitable MPPT (Maximum Power Point Tracking) algorithm according to techniques well known in the art.

The cascaded inverter 13 is adapted to convert the DC voltage from said upstream DC/DC converter 11 into an AC voltage adapted to be delivered to the utility grid 21 or to supply AC loads within the micro grid where the DC/AC converter is located.

The controller 12 of the DC/AC converter according to the present invention comprises a hybrid current controller and means to detect the presence of inrush current. Said controller 12 can be advantageously implemented with a hardware or a software structure coded into firmware and executed by a suitable processing unit such as a digital signal processor (DSP).

If inrush current is detected, the control of the current of the DC/AC converter according to the present invention is transferred from a primary current controller to a secondary transient current controller that starts working with a reduced current reference $I_{Ref}$ with respect to the current reference $I_{Ref}$ before the transient, said secondary controller being preferably faster than said primary controller and adapted to take over current control in a very short time to handle fast and short transients. Reducing the current reference $I_{Ref}$ at an early stage of the transient increases the distance to the current limit thus improving the transient control action effectiveness and avoiding the risk of the DC/AC converter tripping into overcurrent protection mode. After the transient is over, control is transferred back to the primary controller.

Thus, in a preferred embodiment of the DC/AC converter according to the present invention said controller 12 comprises:

a voltage controller (VC) 17;
a primary current controller (PC) 15 which is active under nominal operation conditions;
a secondary current controller or transient current controller (SC) 18 which is active under inrush current situations, said primary controller 15 and said secondary controller 18 being independent from each other;
means for detecting the presence of an inrush transient;
means for transferring the control between said primary current controller 15 and said secondary current controller or transient current controller 18 after an inrush transient is detected.

Said controller 12 preferably implements a double regulation loop, an inner output current regulation loop and an outer input voltage regulation loop. Said outer voltage loop is adapted to provide the current reference value $I_{Ref}$ for said inner output current regulation loop based on the level of the input DC voltage available, said inner current loop is adapted to regulate the current injected into the grid 21 and therefore is responsible for the power quality output by the converter.

Typically proportional integral (PI) regulators are employed to achieve the voltage tracking. The current control can employ several control methods known in the art: proportional integral control (PI), proportional resonant control (PR), dead beat (DB) control, linear quadratic control (LQR), hysteresis based control and others and can be done in rotating or stationary reference frame according to techniques well known in the art.

The output current regulation loop is based on said primary current controller 15 and on said secondary current controller 18, both adapted to sense the output AC current of the DC/AC converter apparatus $I_{Out}$ and control the generation of instantaneous output current of said inverter 13 according to the sensed current. The generation of instantaneous output current of inverter 13 is controlled such that the output AC current follows the reference current $I_{Ref}$.

The input voltage regulation loop is based on a voltage controller 17 adapted to sense the DC link voltage $V_{DC}$ (input voltage of said inverter 13 and output voltage of said DC/DC converter 11) and control the generation of the reference current $I_{Ref}$ with which the sensed current $I_{Out}$ is compared. The input voltage regulation loop can be further adapted to match the input voltage to a reference point $V_{Ref}$.

Said means for detecting the presence of an inrush transient preferably comprise a sensor (S) 23 adapted to measure the rate of change of the voltage associated to the filter 19 on the AC side of the DC/AC converter. Other ways of detecting an ongoing inrush transient can be employed as well. The sensing and measurement of the rate of change of the voltage associated to the filter 19 is preferred among others because it is reliable—despite being based on the reading on the inverter side current, which is affected by the switching ripple—and appears to be less prone to errors due to electromagnetic noise. Preferably, the sensed voltage associated to the filter 19, according to the present invention, is the voltage across the shunt branch of the filter 19. In case of LC or LCL type filters, the sensed filter voltage is thus the voltage across the capacitor C.

When the controller 12 is implemented with a software structure, the derivative of the voltage associated to filter 19 on the inverter AC side, and therefore the rate of change of the voltage associated to the filter 19, may be estimated through the following difference equation, valid for three-phase systems:

$$\Delta_p[k] = 1/T_s \cdot \max\{|v_{rs}[k] - v_{rs}[k-1]|, |v_{st}[k] - v_{st}[k-1]|, |v_{tr}[k] - v_{tr}[k-1]|\}$$

where $v_{rs}$, $v_{st}$ and $v_{tr}$ are the phase-to-phase inverter filter voltages and where $T_s$ is the sampling time at which said phase-to-phase inverter filter voltages are measured.

When an inrush transient is present, the corresponding inrush current makes the rate of change of the voltage associated to the filter 19 change as well, so that $\Delta_p[k]$ exceeds a predetermined threshold for any one of the phases r, s and t thus determining the presence of an inrush transient emergency and activating said means for switching between said primary current controller 15 and said secondary current controller 18. Therefore, when an inrush transient is detected, the control of the DC/AC converter current is transferred from said primary current controller 15 to said secondary current controller 18, and the current reference $I_{Ref}$ amplitude is promptly reduced.

Said means for transferring the control between said primary current controller 15 and said secondary current controller 18 when an inrush transient is detected may comprise a switching module (SM) 22 associated to said primary controller 15 and to said secondary controller 18, said switching module 22 being controlled by the output signal of said means for detecting the presence of an inrush transient.

During normal operation said switching module 22 is such as to enable said primary controller 15 and disable said secondary controller 18. When an inrush transient is detected said switching module 22 is such as to disable said primary controller 15 and enable said secondary controller 18, allowing the DC/AC converter apparatus according to the present invention to enter an emergency operating mode. Said switching module 22 can be implemented with one or more controlled switch associated to said primary and secondary controllers 15, 18 and adapted to connect and disconnect said primary and secondary controllers 15, 18 from within the output current regulation loop of said controller 12.

After an inrush transient has been detected and the DC/AC converter apparatus enters the emergency operating mode, said secondary controller 18 starts operating with a new current reference value which is lower than the current reference employed by said primary controller 15 during normal operation, before the inrush transient. The new current reference value can be chosen arbitrarily according to the requirements of the utility or the grid 21 or any other necessity.

Forcing a lower current reference value leads to an initial saturation of said outer input voltage regulation loop and therefore—in case of a double stage converter—the converter will momentarily operate without achieving MPPT.

After a predetermined time T1 in emergency operating mode, the control of the DC/AC converter is transferred back to the normal operating mode, said secondary controller 18 being disabled and said primary controller 15 being enabled back. The transition between said primary controller 15 and said secondary controller 18 is preferably done in a continuous way during a certain transition time T2. When the emergency operating mode ends, a transition operating mode starts wherein the control of the output current regulation loop is chosen as a combination of said secondary controller 18 and said primary controller 15 to ensure a smooth transition. To this purpose, the control function u(t) of said output current regulation loop may be formulated as a weighted sum of primary and secondary controller outputs, employing time dependent weighting factors. Said emergency operating mode therefore extends over a time interval T1+T2 arbitrarily chosen. As an example, during said time interval T2, the control function u(t) of said output current regulation loop may be expressed as:

$$u(t)=\lambda(t)u2(t)+(1-\lambda(t))u1(t),$$

where $\lambda(t)$ is a linear function of time with initial value one and final value zero, u1(t) is the control function of said output current regulation loop when only said primary controller 15 is enabled and u2(t) is the control function of said output current regulation loop when only said secondary controller 18 is enabled.

Other transition strategies may be chosen according to the requirements of the utility or the grid 21 or any other necessity.

The control of said output current regulation loop can be implemented in several known fashions: proportional integral control (PI), proportional resonant control (PR), dead beat control (DB), linear quadratic control (LQR), hysteresis based control and others. In general, at least for this type of applications, DB and LQR control are considered to allow implementing faster regulation loops.

As a non-limiting example said primary controller 15 can be implemented with a proportional integral control and said secondary controller 18 with a more aggressive linear quadratic control.

According to different embodiments of the present invention, the switches of said inverter 13 can be operated using either symmetric or asymmetric modulation. In symmetric modulation, the output of the controller is a piecewise constant staircase function where the length of each step is $1/f_{PWM}$, where $f_{PWM}$ is the switching frequency of the PWM. As a result, the pulses of the modulator are centred with respect to the switching interval.

In asymmetric modulation, the output of the controller is a piecewise constant staircase function where the length of each step is $½\ f_{PWM}$. As a result, the pulses of the modulator need not to be centred with respect to the switching interval. Since in asymmetric PMW the controller operates at twice the frequency with respect to symmetric PWM, asymmetric PWM has smaller delay and can react faster to perturbations. In particular, asymmetric PWM can reduce the current peak which occurs when an inrush phenomenon happens. Asymmetric PWM is therefore preferred when a faster performance is required.

The DC/AC converter according to the present invention and the associated control method are adapted to manage the inrush transients without switching off the inverter. This feature brings great advantage in that power delivery to the grid suffers no interruptions Furthermore, the DC/AC converter according to the present invention and the associated control method allow the managing of inrush transients in a way to minimize the temporary reduction of output power delivered to the grid during the inrush transient. Said temporary reduction of output power will be barely detectable by the state of the art watt-meters which normally rely on the measurement of RMS values of current and voltage over a full fundamental period.

The invention claimed is:

1. An apparatus for converting a DC input voltage into an AC voltage comprising:
a DC/AC converter adapted to convert the voltage of a DC voltage source into an AC voltage for supplying a load and for delivering to a utility grid;
a filter interposed between the output of said DC/AC converter and the grid and adapted to remove high frequency ripple from said AC voltage;
a controller adapted to manage and regulate the operation of said DC/AC Converter said controller comprising a voltage controller and a current controller, said voltage controller being adapted to provide the current reference value ($I_{Ref}$) for said current controller based on the level of the input DC voltage available, said current controller being adapted to regulate the current injected into the grid, wherein
said current controller comprises a primary current controller and a secondary current controller and in that
said controller further comprises:
means for detecting the presence of inrush current on the output of said DC/AC converter;
means for transferring the control between said primary current controller and said secondary current controller after an inrush transient is detected, said secondary current controller being faster than said primary current controller and working with a reduced current reference ($I_{Ref}$) with respect to the current reference ($I_{Ref}$) of said primary current controller before the transient.

2. The apparatus according to claim 1 wherein said means for detecting the presence of inrush current on the output of said DC/AC converter comprise a sensor adapted to measure the rate of change of the voltage associated to said filter.

3. The apparatus according to claim 2 wherein said voltage associated to said filter is the voltage across the shunt branch of said filter.

4. The apparatus according to claim 2 wherein said means for transferring the control between said primary current controller and said secondary current controller after an inrush transient is detected comprise a switching module controlled by the output signal of said means for detecting the presence of an inrush current on the output of said DC/AC converter, said switching module being adapted to:
enable said primary controller and disable said secondary controller during normal operating mode and
disable said primary controller and enable said secondary controller after an inrush current on the output of said DC/AC converter is detected, allowing said DC/AC converter to enter an emergency operating mode.

5. The apparatus according to claim 4 wherein said switching module is further adapted to:
gradually enable said primary controller and gradually disable said secondary controller during a transition operating mode following said emergency operating mode, wherein the control of the output current regulation loop is chosen as a combination of said secondary controller and said primary controller.

6. The apparatus according to claim 1 wherein said means for transferring the control between said primary current controller and said secondary current controller after an inrush transient is detected comprise a switching module controlled by the output signal of said means for detecting the presence of an inrush current on the output of said DC/AC converter, said switching module being adapted to:
enable said primary controller and disable said secondary controller during normal operating mode and
disable said primary controller and enable said secondary controller after an inrush current on the output of said DC/AC converter is detected, allowing said DC/AC converter to enter an emergency operating mode.

7. The apparatus according to claim 6 wherein said switching module is further adapted to:
gradually enable said primary controller and gradually disable said secondary controller during a transition operating mode following said emergency operating mode, wherein the control of the output current regulation loop is chosen as a combination of said secondary controller and said primary controller.

8. The apparatus according to claim 7 wherein said switching module comprises one or more controlled switches associated to said primary and secondary controllers and adapted to enable and disable said primary and secondary controllers according to the status of the output signal of said means for detecting the presence of an inrush current on the output of said DC/AC converter.

9. The apparatus according to claim 6 wherein said switching module comprises one or more controlled switches associated to said primary and secondary controllers and adapted to enable and disable said primary and secondary controllers according to the status of the output signal of said means for detecting the presence of an inrush current on the output of said DC/AC converter.

10. A controller for a DC/AC converter, adapted to manage and regulate the operation of said DC/AC converter during inrush current transient, said controller comprising a voltage controller and a current controller, said voltage controller being adapted to provide the current reference value ($I_{Ref}$) for said current controller based on the level of the input DC voltage available, said current controller being adapted to regulate the current injected into the grid by said DC/AC converter, wherein
said current controller comprises a primary current controller and a secondary current controller and in that said controller further comprises:
means for detecting the presence of inrush current on the output of said DC/AC converter;
means for transferring the control between said primary current controller and said secondary current controller after an inrush transient is detected, said secondary current controller being faster than said primary current controller and working with a reduced current reference ($I_{Ref}$) with respect to the current reference ($I_{Ref}$) of said primary current controller before the transient.

11. The controller according to claim 10 wherein said means for detecting the presence of inrush current on the output of said DC/AC converter comprise a sensor adapted to measure the rate of change of the voltage associated to said filter.

12. The controller according to claim 11 wherein said means for transferring the control between said primary current controller and said secondary current controller after an inrush transient is detected comprise a switching module controlled by the output signal of said means for detecting the presence of an inrush current on the output of said DC/AC converter, said switching module being adapted to:
enable said primary controller and disable said secondary controller during normal operating mode and
disable said primary controller and enable said secondary controller after an inrush current on the output of said DC/AC converter is detected, allowing said DC/AC converter to enter an emergency operating mode.

13. The controller according to claim 12 wherein said switching module is further adapted to:
gradually enable said primary controller and gradually disable said secondary controller during a transition operating mode following said emergency operating mode, wherein the control of the output current regulation loop is chosen as a combination of said secondary controller and said primary controller.

14. The controller according to claim 10 wherein said means for transferring the control between said primary current controller and said secondary current controller after an inrush transient is detected comprise a switching module controlled by the output signal of said means for detecting the presence of an inrush current on the output of said DC/AC converter, said switching module being adapted to:
enable said primary controller and disable said secondary controller during normal operating mode and
disable said primary controller and enable said secondary controller after an inrush current on the output of said DC/AC converter is detected, allowing said DC/AC converter to enter an emergency operating mode.

15. The controller according to claim 14 wherein said switching module is further adapted to:
gradually enable said primary controller and gradually disable said secondary controller during a transition operating mode following said emergency operating mode, wherein the control of the output current regulation loop is chosen as a combination of said secondary controller and said primary controller.

16. The controller according to claim 14 wherein said switching, module comprises one or more controlled switches associated to said primary and secondary controllers and adapted to enable and disable said primary and secondary controllers according to the status of the output signal of said means for detecting the presence of an inrush current on the output of said DC/AC converter.

17. A method for managing and regulating the operation of a DC/AC converter during inrush current transient, comprising the steps of:
   a. providing a controller comprising a voltage controller and a current controller, said voltage controller being adapted to provide the current reference value ($I_{Ref}$) for said current controller based on the level of the input DC voltage available, said current controller being adapted to regulate the current injected into the grid and comprising a primary current controller and a secondary current controller;
   b. detecting the presence of inrush current transient;
   c. if inrush current is detected, then modify the actual current reference ($I_{Ref}$) of said current controller in order to lower the current injected into the grid by said DC/AC converter, disable said primary controller and enable said secondary controller entering emergency operating mode, said secondary current controller being faster than said primary current controller;
   d. after a time T, restore the previous current reference ($I_{Ref}$) of said current controller, enable said primary controller and disable said secondary controller restoring normal operating mode.

18. The method according to claim 17 wherein said step d. is carried out through the following steps:
   d1. after a time T1, start a transition operating mode time interval T2 wherein said secondary controller is gradually disabled and said primary controller is gradually enabled;
   d2. after a time T2, fully enable said primary controller and fully disable said secondary controller restoring normal operating mode.

19. The method according to claim 18 wherein during said time interval T2, the control function u(t) of said output current regulation loop is a weighted sum of primary controller and secondary controller outputs, employing time dependent weighting factors.

20. The method according to claim 18 wherein during said time interval T2, the control function u(t) of said output current regulation loop is $u(t)=\lambda(t)u2(t)+(1-\lambda(t))u1(t)$, where $\lambda(t)$ is a linear function of time with initial value one and final value zero, u1(t) is the control function of said current controller when only said primary controller is enabled and u2(t) is the control function of said output current regulation loop when only said secondary controller is enabled.

* * * * *